(12) United States Patent
Hongpeng et al.

(10) Patent No.: US 9,966,712 B1
(45) Date of Patent: May 8, 2018

(54) BATTERY PLUG-IN DEVICE FOR MATERIAL HANDLING EQUIPMENT

(71) Applicant: Big Lift, LLC, Lombard, IL (US)

(72) Inventors: Xu Hongpeng, Hangzhou (CN); Xu Linjie, Hangzhou (CN); Xu Minghui, Hangzhou (CN)

(73) Assignee: BIG LIFT, LLC, Lombard, IL (US)

( * ) Notice: Subject to any disclaimer, the term of this patent is extended or adjusted under 35 U.S.C. 154(b) by 0 days. days.

(21) Appl. No.: 15/337,173

(22) Filed: Oct. 28, 2016

(30) Foreign Application Priority Data

Oct. 14, 2016 (CN) .......................... 2016 1 0896611

(51) Int. Cl.
| | |
|---|---|
| *B60R 16/04* | (2006.01) |
| *H01R 24/76* | (2011.01) |
| *H01R 13/05* | (2006.01) |
| *H01R 13/10* | (2006.01) |
| *H01R 13/15* | (2006.01) |
| *H01R 24/66* | (2011.01) |
| *B60L 11/18* | (2006.01) |

(52) U.S. Cl.
CPC .......... *H01R 24/76* (2013.01); *B60L 11/1877* (2013.01); *H01R 13/052* (2013.01); *H01R 13/10* (2013.01); *H01R 13/15* (2013.01); *H01R 24/66* (2013.01); *B60L 2200/44* (2013.01)

(58) Field of Classification Search
CPC ........ B60R 16/04; H01M 2/1083; H01M 2/06
USPC ................... 180/68.5; 429/99, 100
See application file for complete search history.

(56) References Cited

U.S. PATENT DOCUMENTS

| | | | | |
|---|---|---|---|---|
| 3,694,729 A | * | 9/1972 | Jones .................... | H02J 7/0024 180/68.5 |
| 4,756,978 A | * | 7/1988 | Nitcher ............... | H01M 2/1077 180/68.5 |
| 5,131,851 A | * | 7/1992 | Billger .................... | B60R 16/04 439/310 |
| 5,764,025 A | * | 6/1998 | Lehmann ................ | B60R 16/04 320/105 |
| 5,789,898 A | * | 8/1998 | Suzuki ............... | B60L 11/1877 180/68.5 |
| 6,016,882 A | * | 1/2000 | Ishikawa ................ | B62K 19/46 180/207.3 |
| 6,095,270 A | * | 8/2000 | Ishikawa .................. | B62H 5/00 180/220 |
| 6,190,795 B1 | * | 2/2001 | Daley ...................... | B60K 1/04 429/100 |
| 6,224,998 B1 | * | 5/2001 | Brouns ................... | B60R 16/04 429/100 |
| 6,230,834 B1 | * | 5/2001 | Van Hout ............... | B60R 16/04 180/68.5 |
| 6,347,679 B1 | * | 2/2002 | Dignitti ................... | B60R 16/04 180/65.1 |

(Continued)

*Primary Examiner* — Jeffrey J Restifo
(74) *Attorney, Agent, or Firm* — Cook Alex Ltd.

(57) ABSTRACT

A battery plug-in device for material handling equipment, including a battery and a base that receives the battery. The battery includes a battery compartment having a bottom that includes a first plug pedestal, with a first plug connected to the first plug pedestal. The battery base includes a receptacle having a second plug pedestal, with the second plug pedestal connected to a retainer, and a second plug connected to the second plug pedestal. The first plug pedestal, first plug, and retainer secure the battery in the battery base, and ensure safe and stable current output.

7 Claims, 6 Drawing Sheets

(56) References Cited

U.S. PATENT DOCUMENTS

| | | | | |
|---|---|---|---|---|
| 6,423,443 B1* | 7/2002 | Tsuboi | B60K 1/04 | |
| | | | 180/68.5 | |
| 6,494,279 B1* | 12/2002 | Hutchens | B60K 1/04 | |
| | | | 180/65.1 | |
| 7,117,966 B2* | 10/2006 | Kohda | B60K 1/04 | |
| | | | 180/65.1 | |
| 7,320,843 B2* | 1/2008 | Harrington | H01M 2/024 | |
| | | | 429/100 | |
| 7,568,538 B2* | 8/2009 | Drosendahl | B62K 9/00 | |
| | | | 180/65.1 | |
| 8,413,947 B2* | 4/2013 | Chiang | B62M 6/90 | |
| | | | 180/207.3 | |
| 8,893,837 B2* | 11/2014 | Kwag | H01R 33/765 | |
| | | | 180/65.1 | |
| 8,919,472 B2* | 12/2014 | Magens | B66F 9/065 | |
| | | | 180/65.1 | |
| 2001/0007727 A1* | 7/2001 | Bolstad | B60K 1/04 | |
| | | | 429/100 | |
| 2002/0003052 A1* | 1/2002 | Hayashi | B62K 5/007 | |
| | | | 180/65.1 | |
| 2002/0066609 A1* | 6/2002 | Dignitti | B60R 16/04 | |
| | | | 180/68.5 | |
| 2003/0070850 A1* | 4/2003 | Reid | B60K 1/04 | |
| | | | 180/68.5 | |
| 2004/0031632 A1* | 2/2004 | Kohda | B60K 1/04 | |
| | | | 180/68.5 | |
| 2005/0056473 A1* | 3/2005 | Damon | B60R 16/04 | |
| | | | 180/68.5 | |
| 2005/0056474 A1* | 3/2005 | Damon | B60R 16/04 | |
| | | | 180/68.5 | |
| 2007/0119641 A1* | 5/2007 | Tien | B60R 16/04 | |
| | | | 180/68.5 | |
| 2012/0025045 A1* | 2/2012 | Meier | H01M 2/1083 | |
| | | | 248/229.1 | |
| 2013/0216883 A1* | 8/2013 | Kawatani | H01M 2/305 | |
| | | | 429/99 | |
| 2014/0083787 A1* | 3/2014 | Lyons | B60R 16/04 | |
| | | | 180/68.5 | |

* cited by examiner

US 9,966,712 B1

BATTERY PLUG-IN DEVICE FOR MATERIAL HANDLING EQUIPMENT

CROSS-REFERENCE TO RELATED APPLICATION

This application claims priority to Chinese Patent Application No. 201610896611.8, filed Oct. 14, 2016, the disclosure of which is hereby incorporated by reference in its entirety.

TECHNICAL FIELD

The invention relates to battery operated material handling equipment, including a battery plug-in device for use in material handling vehicles, such as pallet trucks, stackers, forklifts and the like, and more particularly to a battery plug-in device that can secure a battery to a base and ensure safe and stable current output by using a first plug pedestal, first plug, and a retainer.

BACKGROUND

Material handling equipment is widely used in warehouses, and electric powered vehicles are continuing to become more popular for at least environmental and noise related advantages over gas powered vehicles. Electric powered vehicles also have advantages over manual powered vehicles relating to at least capacity, operator safety and efficiency. In a traditional configuration, a battery is fixed to the vehicle. When the battery is discharged, the vehicle must be shut down and be out of service while undergoing charging of the battery. It can take a long time to achieve a fully charged battery, which affects the efficiency of the material handling operations.

SUMMARY

The subject matter of this disclosure provides advantages over the battery systems of typical prior art electrical material handling equipment, such as pallet trucks, stackers, forklifts and the like. In contrast to prior art electric vehicle drive systems having a battery fixed to the vehicle, the present disclosure provides an example battery plug-in device that permits an operator to easily remove the battery from the vehicle and plug it into a similar base that is connected to a battery charger. Meanwhile, a fully-charged battery can be plugged into a base that is connected to the vehicle, to provide enhanced efficiency by allowing the vehicle to be placed back into service without having to wait for a battery onboard to be recharged. However, frequent plug-in and removal of a battery will tend to subject battery and base connection parts to wear, which may lead to loosening of the connect parts and/or poor electrical connections. The example battery plug-in device of the present disclosure includes structure to resist wear and loosening, improving the stability of repeated battery: connections.

In a first aspect, the disclosure provides a battery plug-in device for material handling equipment, including a battery and a base that receives the battery. The battery includes a battery compartment having a bottom that includes a first plug pedestal, with a first plug connected to the first plug pedestal. The battery base includes a receptacle which includes a second plug pedestal, with the second plug pedestal connected to a retainer, and a second plug connected to the second plug pedestal. The first plug, first plug pedestal, and retainer secure the battery in the battery base, and ensure safe and stable current output.

It is to be understood that both the foregoing general description and the following detailed description are exemplary and provided for purposes of explanation only, and are not restrictive with respect to the claimed subject matter. Further features and advantages will become more fully apparent in the following description of the example preferred embodiment and from the appended claims.

BRIEF DESCRIPTION OF THE DRAWINGS

In describing the preferred example, references are made to the accompanying drawing figures wherein like parts have like reference numerals. For ease of viewing and comprehension, several of the figures show less than an entire battery system or show only particular components of the system.

It should be understood that the drawings are not necessarily to scale. While some mechanical details of material handling equipment have been omitted, including some details of fastening or connecting means and other plan and section views of the particular components, such details are considered to be within the comprehension of those skilled in the art in light of the present disclosure, it also should be understood that the present disclosure is not limited to the examples illustrated and described.

DETAILED DESCRIPTION OF THE PREFERRED EMBODIMENT

This disclosure provides solutions to the technical problems presented by battery systems of battery operated material handling equipment, such as are used in pallet trucks, stackers, forklifts and the like. An example of a new battery plug-in device B is described further herein in reference to a preferred embodiment shown in the accompanying drawing FIGS. 1-6, and with utilization in material handling equipment, such as an example vehicle 31 in the form of a pallet truck shown in FIGS. 7 and 8. It will be appreciated, however, that the invention may be constructed and configured in various ways and is not limited to the specific example shown and described herein, and its use is not limited to pallet trucks.

Figure 1:
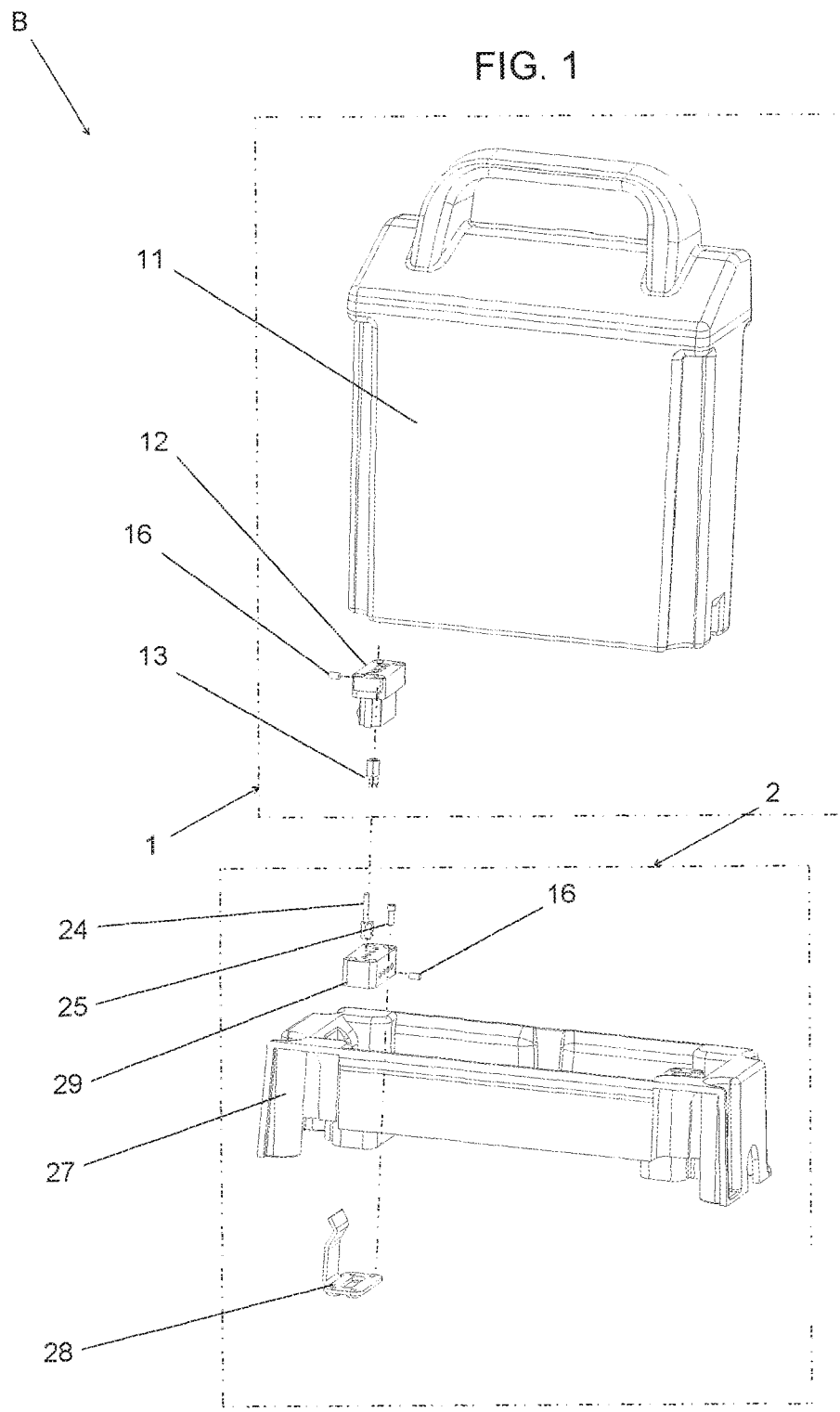
FIG. 1 is a perspective exploded view of a battery plug-in device that includes a battery and a base.
Figure 2:
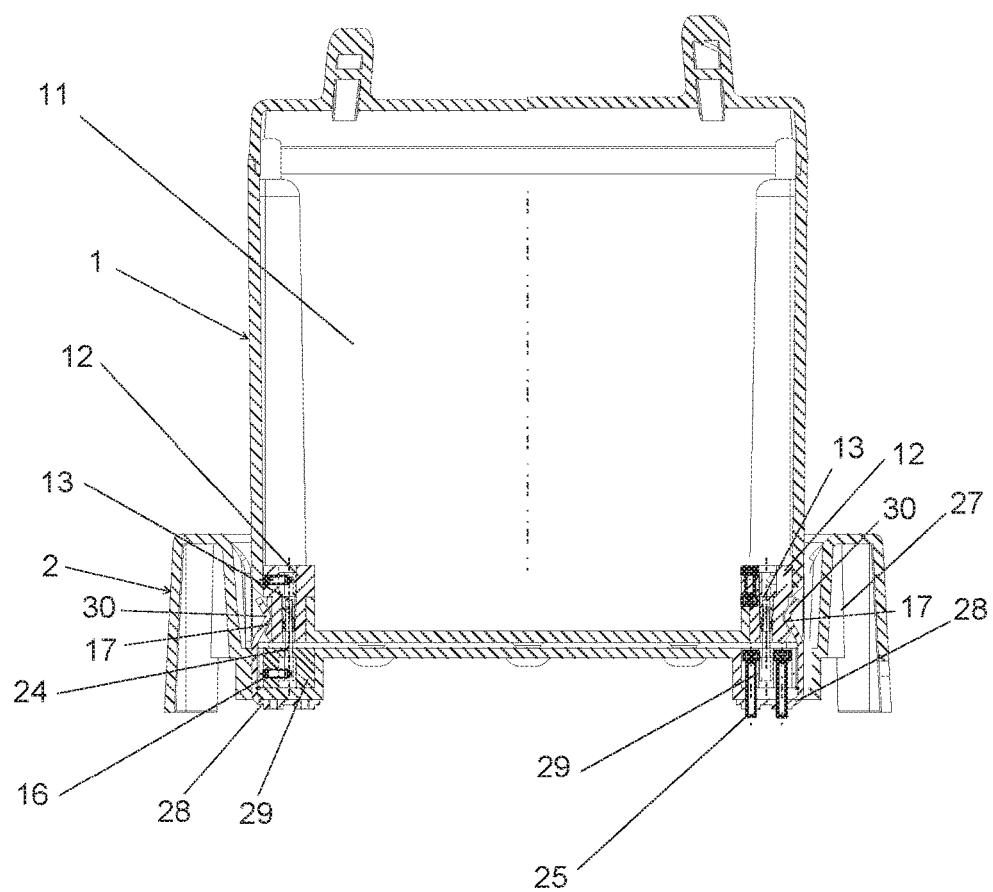
FIG. 2 is a cross-sectional view of the battery plug-in device shown in FIG. 1, with the battery installed in the base and, for ease of viewing, focusing on some elements on the left side of the assembly, while focusing on other elements on the right side of the assembly.

To provide a battery plug-in device B that permits improved efficiency and solves the loosening problem may tend to occur with traditional plug-in batteries, the present disclosure provides a solution that includes a battery plug-in device B for material handling equipment that includes a battery 1 and a base 2, as may be seen in FIGS. 1 and 2. It will be appreciated that a battery 1 and base 2 may include more than one set of components to complete an electrical connection and retention of the battery 1 in the base 2, such as may be seen in FIG. 2. However, it should be understood that for ease of viewing, FIG. 2 focuses on some of the components on the left side of the assembly, while focusing on other components on the right side of the assembly, and where when fully assembled, the left and right sides of the assembly would include similar components.

As may be seen in FIG. 1 and on the left side of the battery plug-in device B in FIG. 2, the battery 1 includes a battery compartment 11 having a bottom that includes a first plug pedestal 12, with a first plug 13 connected to the first plug pedestal 12. The connection of the first plug 13 to the first plug pedestal 12 may be by a fastener 16, shown for example in the form of a screw, although it will be appreciated that the components may be configured to use a different suitable fastener and/or more than one fastener. In this disclosure, an example of the first plug 13 is provided in the form of a female plug, otherwise known as a female electrical terminal, as seen in an enlarged view in FIG. 3.

As may be seen in FIG. 1 and on the right side of the assembly in FIG. 2, the base 2 includes a receptacle 27 having a second plug pedestal 29, with the second plug pedestal 29 connected to a retainer 28. The connection of the retainer 28 to the second plug pedestal 29 may be by at least one retainer fastener 25, shown for example in the form of a screw, although it will be appreciated that the components may be configured to use a different suitable retainer fastener and/or more than one retainer fastener. Also, as seen on the left side of the assembly in FIG. 2, a second plug 24 is connected to the second plug pedestal 29. The connection of the second plug 24 to the second plug pedestal 29 may be by a second fastener 16, shown for example in the form of a screw, although it will be appreciated that the components may be configured to use a different suitable fastener and/or more than one fastener. In this disclosure, an example of the second plug 24 is provided in the form of a male plug, otherwise known as a male electrical terminal, as seen in an enlarged view in FIG. 4, which may be inserted into the first plug 13.

Figures 3, 4:
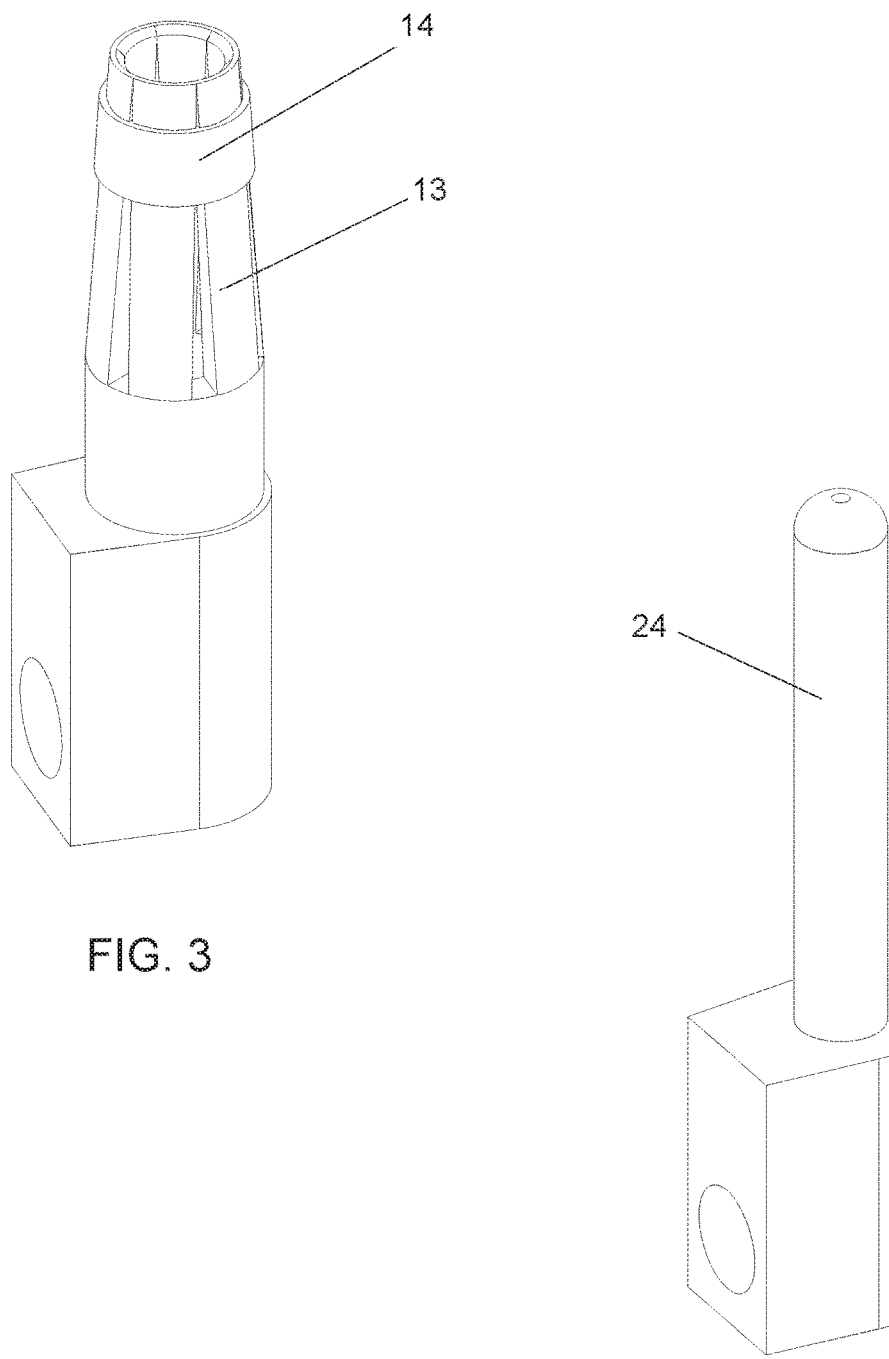
FIG. 3 is a close up perspective view of a first plug of the battery plug-in device shown in FIG. 1.
FIG. 4 is a close up perspective view of a second plug of the battery plug-in device shown in FIG. 1, which cooperates with the first plug.
Figure 7:
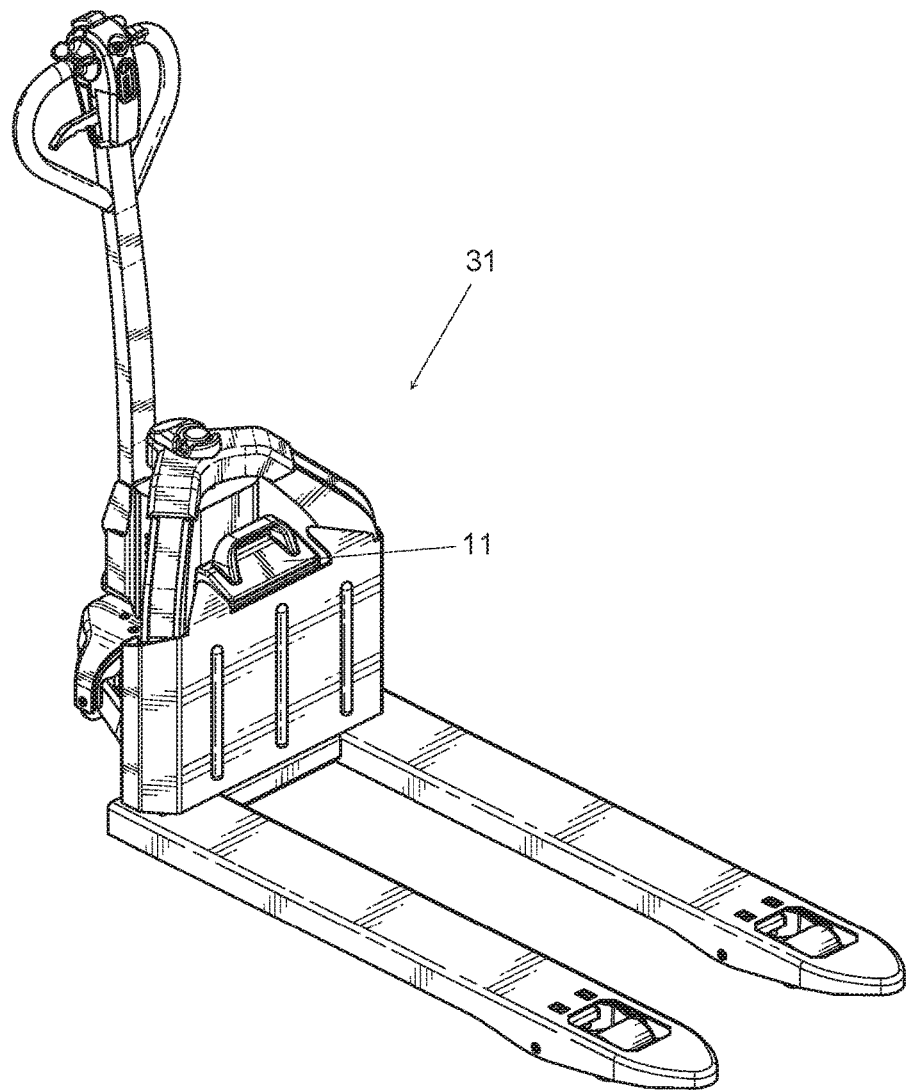
FIG. 7 is a front perspective view of an example pallet truck utilizing the battery plug-in device shown in FIG. 1.
Figure 8:
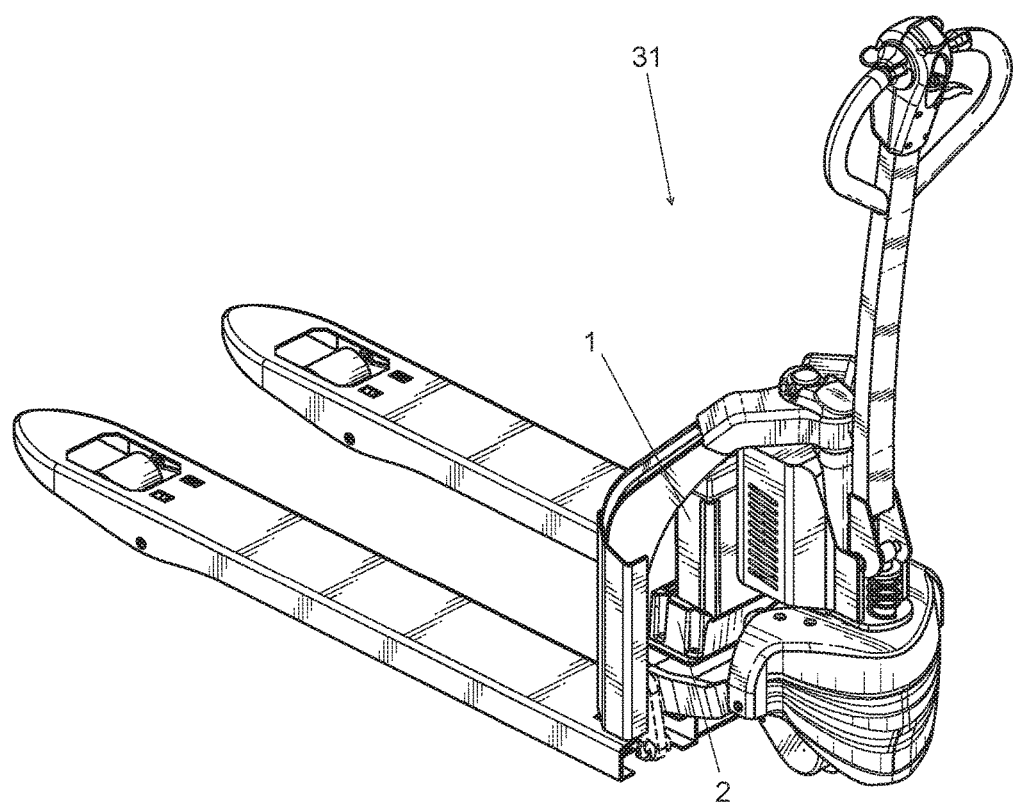
FIG. 8 is a rear perspective view of the example pallet truck utilizing the battery plug-in device shown in FIG. 7.

As may be seen in FIG. 3, the head of the example first plug 13 also may include spring clamps 14, which receive the second plug 24 shown in FIG. 4. The spring clamps 14 help to tightly secure the second plug 24 to the example first plug 13 when the battery 1 is plugged into the base 2, electrically securing the battery 1 to the base 2 whether for use in a battery charger having a base 2 or during use of material handling equipment having a base 2, such as a vehicle 31 in the form of a pallet truck that is shown in FIGS. 7 and 8.

Figure 5:
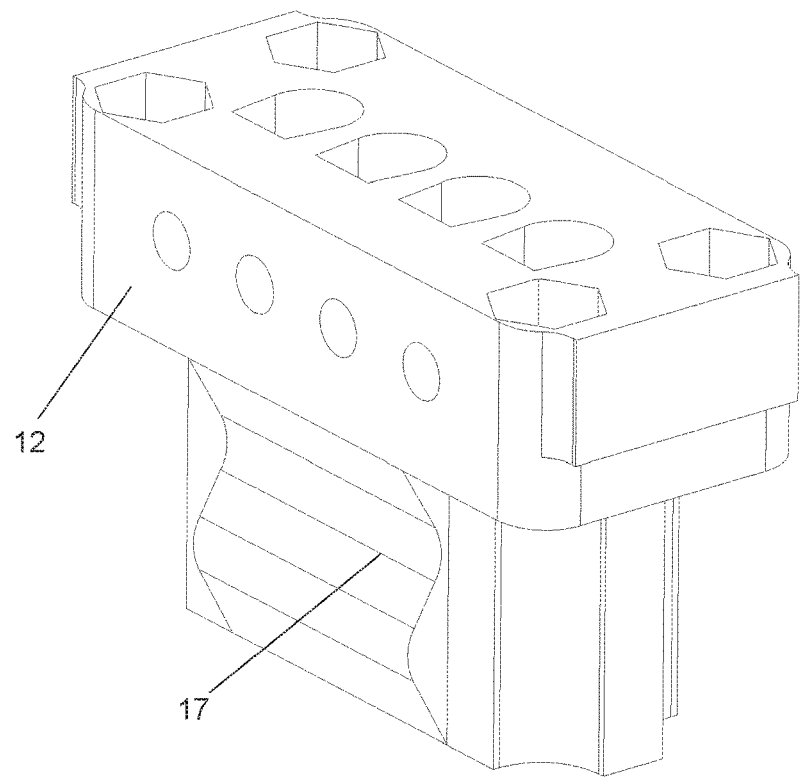
FIG. 5 is a close up perspective view of a first plug pedestal of the battery plug-in device shown in FIG. 1.
Figure 6:
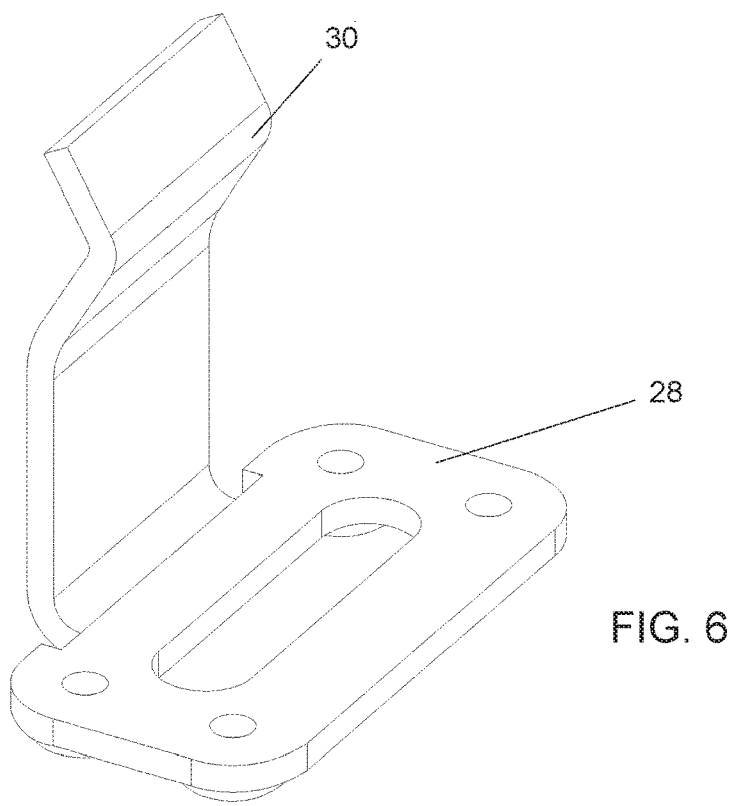
FIG. 6 is a close up perspective view of a retainer of the battery plug-in device shown in FIG. 1.

In addition, improved retention of the battery 1 within the base 2 is achieved with a groove 17 on a side of the first plug pedestal 12 that receives a protruding portion 30 on the retainer 28, which may be seen in FIG. 2 by viewing features on both sides of the assembly, and are shown separately in FIGS. 5 and 6. Resilience of the retainer 28 helps to permit the protruding portion 30 to slide and deflect to be received by the groove 17 on the first plug pedestal 12, so as to tightly secure the first plug pedestal 12 and battery 1 to the base 2 when the battery 1 is plugged into the base 2. Moreover, it will be appreciated that each first plug pedestal 12 of the battery 1 may hold more than one first plug 13, and each second plug pedestal 29 of the base 2 may hold more than one second plug 24, as desired.

The example battery plug-in device B provides a low cost, simple structure that facilitates easy plug-in and removal of the battery, ensures stable battery connections and enhances efficiency by keeping a Vehicle in service via convenient separate charging of a battery so as to avoid interruptions to charge an onboard battery. The structure also permits easy replacement of the electrical components, if needed.

Thus, the present disclosure presents alternatives to prior art battery systems for material handling equipment. The new battery plug-in device provides advantageous features by permitting convenient battery removal and recharging of a battery separated from a vehicle, while a second battery may be installed to keep the vehicle in service. This provides a low cost, convenient solution, while significantly improving utility and efficiency of such electrically operated material handling equipment.

It will be appreciated that the present disclosure shows and demonstrates a preferred example battery plug-in device for material handling equipment, which is discussed in the context of an example pallet truck. Indeed, this example is merely illustrative and is not to be considered limiting. It will be apparent to those of ordinary skill in the art that the battery plug-in device may be constructed and configured for use in various material handling equipment, without departing from the scope or spirit of the present disclosure. Thus, although an example has been described herein for use in a pallet truck, the scope of coverage of this patent is not limited thereto. On the contrary, this patent covers all methods, apparatus and articles of manufacture fairly falling within the scope of the appended claims either literally or under the doctrine of equivalents.

The invention claimed is:

1. A battery plug-in device for material handling equipment, comprising:
   a battery further comprising a battery compartment having a bottom that includes a first plug pedestal, further comprising a groove on a side of the first plug pedestal;
   a first plug connected to the first plug pedestal, and the first plug being configured as a female plug and further comprising a head having a spring clamp;
   a base that receives the battery and includes a receptacle having a second plug pedestal and a retainer connected to the second plug pedestal, wherein the retainer further comprises a protruding portion,
   a second plug connected to the second plug pedestal, and the second plug being configured as a male plug;
   wherein the groove on the side of the first plug pedestal receives the protruding portion of the retainer when the battery is plugged into the base.

2. The battery plug-in device of claim 1, wherein the first plug is connected to the first plug pedestal by a fastener.

3. The battery plug-in device of claim 2, wherein the fastener by which the first plug is connected to the first plug pedestal is a screw.

4. The battery plug-in device of claim 1, wherein the retainer is connected to the second plug pedestal by a retainer fastener.

5. The battery plug-in device of claim 4, wherein the retainer fastener by which the retainer is connected to the second plug pedestal is a screw.

6. The battery plug-in device of claim 1, wherein the second plug is connected to the second plug pedestal by a second fastener.

7. The battery plug-in device of claim 6, wherein the second fastener by which the second plug is connected to the second plug pedestal is a screw.

\* \* \* \* \*